United States Patent Office 3,373,616
Patented Mar. 19, 1968

3,373,616
GYROSCOPIC INSTRUMENT WITH MEANS FOR INTRODUCING ITS ANGULAR DATA INTO A DIGITAL COMPUTER
Pierre Henri Dugay, Asnieres, France, assignor to D.B.A., Paris, France, a French company
Filed Oct. 16, 1964, Ser. No. 404,416
Claims priority, application France, Oct. 18, 1963, 951,084, Patent 1,380,644
5 Claims. (Cl. 74—5.6)

ABSTRACT OF THE DISCLOSURE

A gyroscopic instrument with means for introducing its angular output quantities into a digital computer.

---

Figure 1:
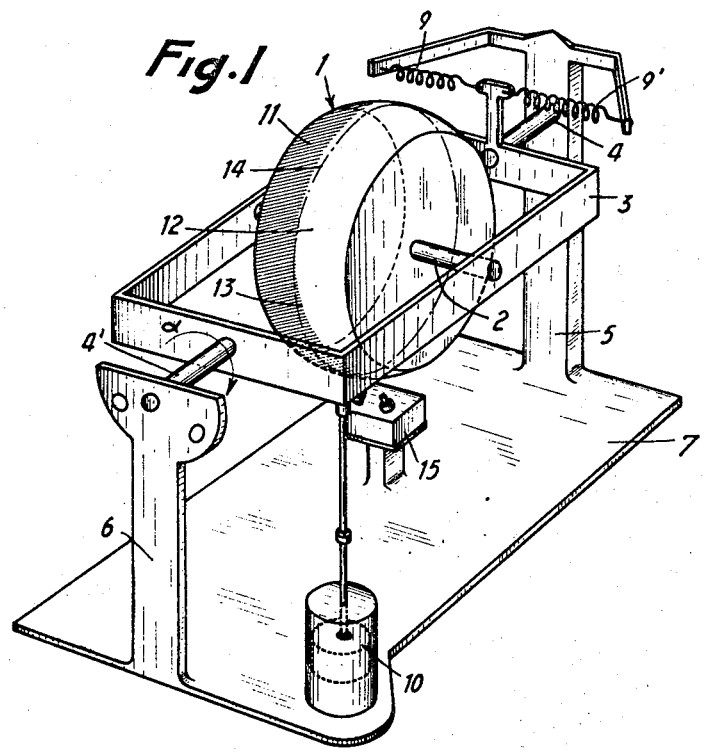

The object of this invention is to provide a gyroscopic instrument with means for introducing its angular output quantities into a digital computer.

As a general rule, gyrometers are equipped with analog detectors, either of the potentiometer type or of the inductance type which are comparable with differential transformers. The conversion of the output elements thus detected to elements which can be introduced into a digital computer is difficult, costly both in precision and in price, above all if it is sought to obtain within the range of utilization of the gyrometer a large number of increments of measurement (500, for example).

Moreover, it is difficult to code directly the angle of rotation of the axle which carries the gyro rotor since this angle is usually fairly small (of the order of a few degress). Gyrometers have preferably a high natural frequency and therefore high rigidity and the relative error in the measurement is proportional to the angle of rotation of the frame.

It is intended in the present invention to provide the gyroscopic rotor with characteristic signs and to associate with said rotor at least one stationary head for reading said signs which are intended to pass in front of said reading head during the rotation of the rotor, in such a manner that the signals delivered by said reading head are of variable length according to the position of said signs in front of said reading head, said length being in turn dependent on the angular datum which is supplied by the gyroscope and which is to be introduced into a digital computer.

The characteristic signs are preferably marked directly on the periphery of the rotor and can be either of an optical or magnetic nature, for example. It will be understood that the reading head is of any corresponding type.

In one particular form of embodiment, the equatorial region of the rotor is separated into two zones which are respectively active and inactive from the point of view of the phenomena employed for reading purposes, for example, a reflecting surface and a frosted surface if an optical reading head is chosen. The zones referred to are separated by a great circle of the sphere, the plane of which is inclined to the plane of the equator at an angle which can be slightly larger than the angle of tilt of the gyroscope frame between its position of equilibrium and its stops, for example an angle of 3° in the case of an angular spacing of 5° between the frame stops; and the reading head is disposed radially in the plane of the equator.

In another form of embodiment, the active zones which deliver the signals are delimited by a series of identical signs, for example curvilineal triangles, which are marked in succession around the periphery of the rotor, variations in the angular datum detected being followed with an even higher degree of accuracy as the number of signs is greater.

In order to obtain good zero precision, provision can be made for two series of characteristic signs which are disposed symmetrically with respect to the equator and with which two reading heads are adapted to cooperate, This arrangement also makes it possible to discriminate between the positive signals and negative signals by identifying, for example, the head which delivers the longest signals, or conversely.

The invention is applicable in particular to gyrometers in which the angle of tilt of the frame about the detection axis is detected in respect of a predetermined angular input velocity which is introduced along the axis of sensitivity.

In the case of the gyrometer, it is well to measure the duration of the signals delivered by the reading head by the number of pulses of a stable time base which is independent of the rotor. In this case, in fact, the measurement taken will be independent of the speed of rotation of the rotor. In the case of an angle-measuring gyroscope, the time base must on the contrary be associated with the rotor, for example by being carried by the equator of this latter so that the signal delivered should be independent of the speed of rotation of said rotor.

Figure 2:
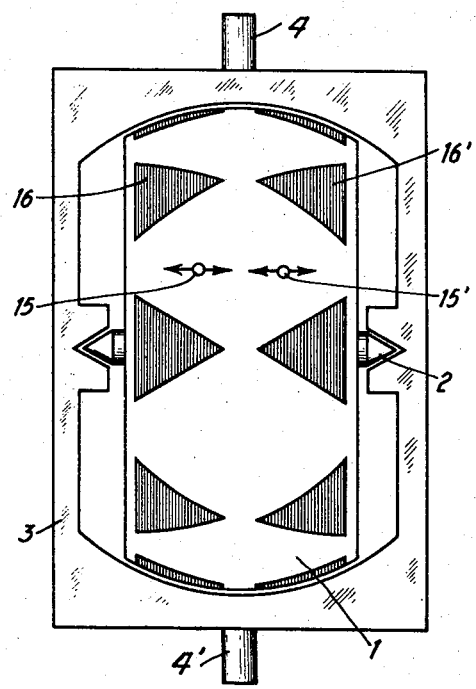

Two examples of embodiment of apparatuses according to the invention have been shown in the accompanying drawings and have been given solely by way of example and not in any sense by way of limitation. In these drawings:

FIG. 1 is a schematic view in perspective of a gyrometer which is fitted with a single reading head, and FIG. 2 is a plan view of an alternative form with two reading heads.

In the example which is illustrated in FIG. 1, the improved instrument in accordance with the invention is a gyrometer consisting of a rotor 1 of frusto-spherical configuration which is adapted to rotate about the axis of the shaft 2 carried by the frame 3. The said frame is capable of tilting about the axis of the shaft 4, 4' which is carried by upright members 5, 6 on a base 7. The frame 3 is urged elastically into a position of equilibrium by springs 9, 9' and the movements of said frame are damped by means of a dash-pot 10.

The gyro rotor 1 is divided into two zones, namely a non-reflecting zone 11 and a reflecting zone 12, by a great circle 13 located in a plane which is slightly displaced through an angle of 3°, for example, with respect to the plane of the equator 14.

A head 15 which is used both for the purpose of illuminating the zones 11, 12 of the rotor and for the purpose of reading the optical track defined by said zones is located beneath the rotor 1 and disposed symmetrically with respect to the plane of the equator 14. Said head 15 is connected to electronic means of known type which supply, for example, a square-wave signal corresponding respectively to the non-reflecting zone and to the reflecting zone of the rotor.

When the frame does not perform any tilting motion, the lengths of the square-waves, namely the movement periods or times which correspond to the two zones are in this case made equal by design.

When an angular velocity is introduced along the axis of sensitivity of the gyrometer, the frame 3 tilts through a certain angle about the axis of detection, that is to say the axis of the shaft 4, 4'. It is no longer the equator but a parallel of the sphere which moves in front of the head 15, and the lengths of the square-waves corresponding to the zones 11 and 12 become different, the sum of these lengths being constant if the speed of the rotor is stable.

The lengths of the square-waves is measured by means of a time base which is independent of the gyrometer and which is included, for example, in the digital computer, in which the difference between these lengths can be computed.

The gyrometer as thus equipped provides an additional advantage in that it gives results which are independent of the speed of rotation of the gyro rotor. In fact, the angle of tilt of the frame is proportional, not only to the angular velocity to be measured but also to the speed of rotation of the gyro rotor; the same applies to the arcs of the optical track which move past in front of the reading head inasmuch as these latter are proportional to the angle of tilt. The periods of movement of these arcs and therefore the numbers of pulses introduced into the digitial computer, which are equal to the quotients of these arcs by the speed of rotation of the gyro rotor, are accordingly independent of this speed of rotation inasmuch as the time base which measures them is not associated with the rotor.

In the alternative form of FIG. 2 which also corresponds to a gyrometer wherein those elements which are similar to those of FIG. 1 are designated by the same reference numerals, the rotor 1 is provided on each side of the plane of the equator 14 with a series of curvilineal triangles 16, 16′ which are disposed symmetrically with respect to the equator and which are marked successively around the entire periphery of the rotor. The said triangles are intended to deliver signals by cooperating with two stationary reading heads 15, 15′ which are also symmetrical with respect to the plane of the equator 14 when the frame is horizontal.

As in the example of FIG. 1, the heads 15, 15′ can supply square-wave signals which correspond to the reflecting zones of the triangles 16, 16′ and to the non-reflecting zones which are comprised between these triangles.

When no tilting motion takes place, a very accurate zero is obtained as a result of the equality of pulses of the two readings.

Signals of opposite direction are obtained according to the direction of inclination of the frame 3 and can be discriminated by identifying the head which delivers the longest signal or conversely.

On account of the multiplication of characteristic figures which are carried by the gyro rotor 1, the computer can work out numerical information from the mean value of the pulses, with the result that the consequences to which any imperfections in the limits of the figures may give rise are accordingly minimized.

What I claim is:
1. In a gyroscopic instrument having a base, a first shaft mounted on said base, a frame mounted on said first shaft for rotation about the axis of said first shaft, a second shaft orthogonal with said first shaft and mounted on said frame, and a rotor mounted on said second shaft for rotation about the axis of said second shaft, said rotor having its equatorial region separated into an active zone and a non-active zone by a line following a great circle of said rotor and inclined to the plane of the equator of said rotor, at least one reading head fixedly mounted on said base in the plane of said equator so said head zones pass in front of said head and being adapted to deliver signals of variable length according to the position of said line with respect to said head.

2. In an instrument as in claim 1, wherein said line of said rotor is inclined to the plane of the equator at an angle slightly larger than the angle of tilt of said frame between its position of equilibrium and its stops.

3. In a gyroscopic instrument having a base, a first shaft mounted on said base, a frame mounted on said first shaft for rotation about the axis of said first shaft, a second shaft orthogonal with said first shaft and mounted on said frame, and a rotor mounted on said second shaft for rotation about the axis of said second shaft, said rotor having its equatorial region separated into a reflecting zone and a frosted zone by a line following a great circle of said rotor and inclined to the plane of the equator of said rotor, at least one optical reading head fixedly mounted on said base in the plane of said equator so said head zone pass in front of said head and being adapted to deliver signals of variable length according to the position of said line with respect to said head.

4. In a gyroscopic instrument having a base, a first shaft mounted on said base, a frame mounted on said first shaft for rotation about the axis of said first shaft, a second shaft orthogonal with said first shaft and mounted on said frame, and a rotor mounted on said second shaft for rotation about the axis of said second shaft, said rotor being provided on its equatorial region with a plurality of identical geometrical surfaces regularly spaced around said zone, and delimiting active zones and non-active zones, at least one reading head fixedly mounted on said base so said head geometrical surfaces pass in front of said head and being adapted to deliver signals of variable length according to the position of said surfaces with respect to said head.

5. In a gyroscopic instrument having a base, a first shaft mounted on said base, a frame mounted on said first shaft for rotation about the axis of said first shaft, a second shaft orthogonal with said first shaft and mounted on said frame, and a rotor mounted on said second shaft for rotation about the axis of said second shaft, said rotor being provided on its equatorial region with two series of a plurality of identical geometrical surfaces regularly spaced around said zone and delimiting active zones and non-active zones, said series being disposed symmetrically with respect to the equator of said rotor, two reading heads fixedly mounted on said base and symmetrically disposed with respect to said equator so two series of zones pass in front of said heads respectively, said heads being adapted to deliver signals of variable length according to the position of said zones with respect to said heads.

References Cited
UNITED STATES PATENTS

| | | | |
|---|---|---|---|
| 2,959,060 | 11/1960 | Kunz | 74—5.6 |
| 3,218,872 | 11/1965 | Swainson | 74—5.6 |
| 3,239,673 | 3/1966 | Unruh | 250—233 X |
| 3,259,890 | 7/1966 | Wood | 250—236 X |

FRED C. MATTERN, Jr., *Primary Examiner.*

J. D. PUFFER, C. J. HUSAR, *Assistant Examiners.*